Aug. 4, 1959        W. R. JESMAN        2,897,629
APPARATUS FOR ELECTRICALLY DESTROYING INSECTS AND THE LIKE
Filed Feb. 6, 1957        2 Sheets-Sheet 1
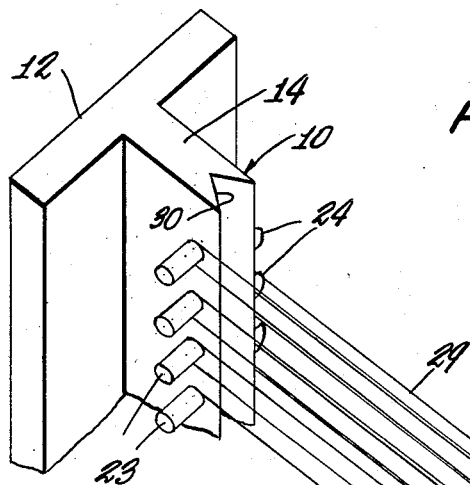
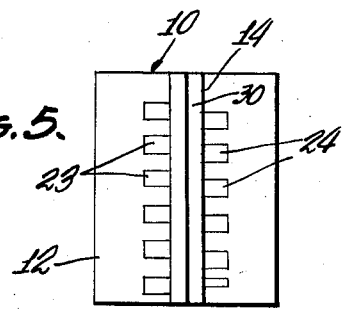
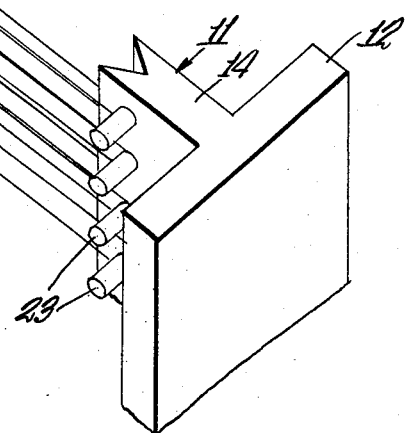
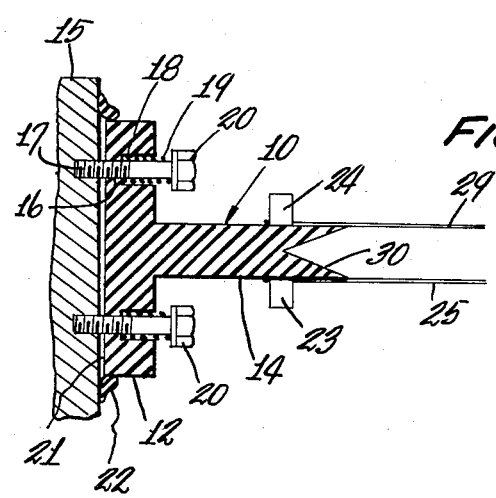
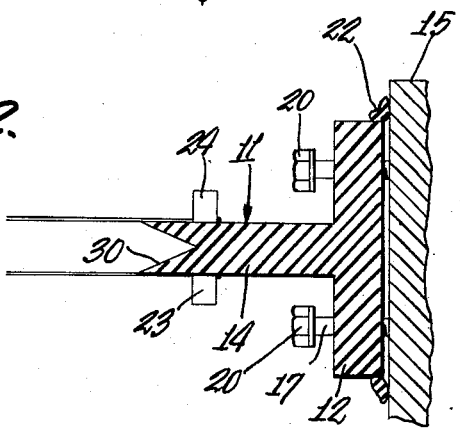
INVENTOR.
WALTER R. JESMAN
BY
ATTORNEY Aug. 4, 1959 W. R. JESMAN 2,897,629
APPARATUS FOR ELECTRICALLY DESTROYING INSECTS AND THE LIKE
Filed Feb. 6, 1957 2 Sheets-Sheet 2
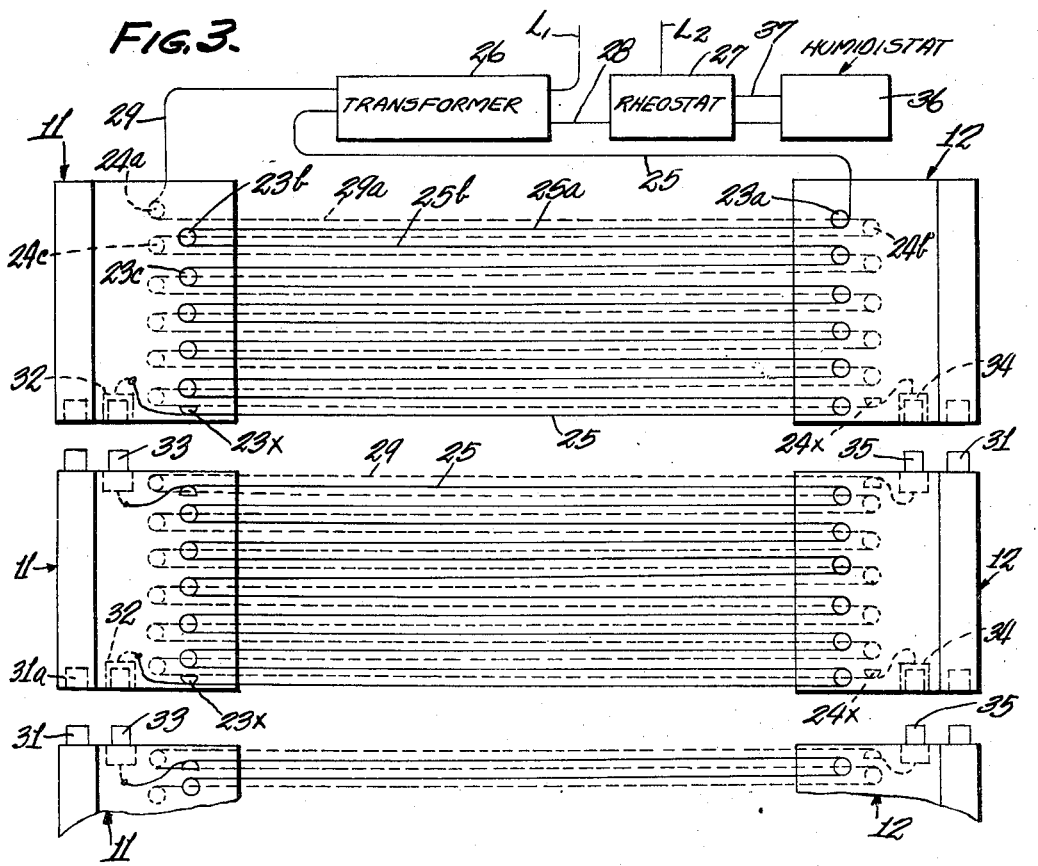
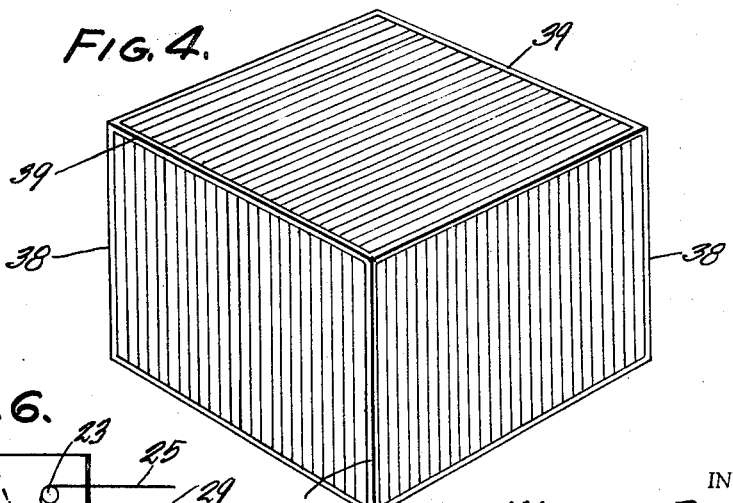
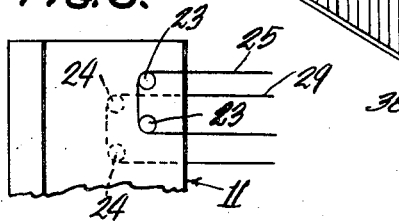
INVENTOR.
WALTER R. JESMAN
BY
ATTORNEY United States Patent Office 2,897,629
Patented Aug. 4, 1959

2,897,629
APPARATUS FOR ELECTRICALLY DESTROYING INSECTS AND THE LIKE

Walter R. Jesman, Scottsdale, Ariz.

Application February 6, 1957, Serial No. 638,647

8 Claims. (Cl. 43—112)

My invention relates to apparatus for electrically destroying insects and the like and the principal object of my invention is to provide new and improved apparatus of this character.

The invention may be effectively used to prevent insects and vermin from entering buildings, such as dwellings, barns, factories and storage enclosures, to name a few. It may also be used for the extermination of insects, particularly disease bearing insects, in areas where such insects are likely to breed or accumulate in great numbers.

Although the invention as herein disclosed is particularly useful in destroying air-borne insects, it may also be used with advantage in the destruction of non-flying insects and of rodents. My invention provides a safe, low cost apparatus which operates effectively for the purposes above described. The foregoing, and other advantages, will be readily apparent from a study of the following specification and from the drawings appended thereto.

In the drawings accompanying this specification and forming a part of this application, there is shown, for purposes of illustration, an embodiment which my invention may assume, and in these drawings:

Figure 1 is a fragmentary perspective view of an element which may form my improved insect destroyer or which may be combined with additional similar elements either to enlarge the final structure or to form an enclosure, Figure 2 is a broken sectional view taken transversely through the element shown in Figure 1, Figure 3 is a side view of three similar elements (one element being fragmentarily shown) to disclose a method of connection, Figure 4 is a schematic representation of an enclosure which may be formed by use of my invention, Figure 5 is a face view of an insulator member, and Figure 6 is a fragmentary elevational view of a slightly different form of the invention.

Referring particularly to Figures 1 through 3 of the drawings, the embodiment of the invention herein disclosed comprises a pair of insulator members 10, 11 which, for purposes of production economy, are preferably identical.

As best seen in Figures 1 and 2, each of the insulator members are of T-shaped in cross-section to provide a base 12 and a rib 14. The base 12 provides means for securing the insulator members to supports 15 of any suitable type depending upon the place and type of installation. The insulator members 10—11 may be formed of any suitable dielectric material and, as an example, a highly polished porcelain glazed material has been found satisfactory.

The insulator members may be made in predetermined lengths and may be used in various multiple combinations to suit application requirements. The base 12 of the insulator members is preferably formed with openings 16 to pass a screw or bolt 17 for the purpose of securing the insulator member to a support 15.

The insulator members are supported with their ribs 14 in facing generally aligned relationship, as best seen in Figure 2. It is advantageous to resiliently urge at least one of the insulator members in a direction away from the other, for a purpose later to become apparent. To accomplish the foregoing, each opening 16 may have an enlargement 18 to receive a coil spring 19 which is interposed between the bottom of the enlargement and the head 20 of the bolt 16. Since a space 21 may at times exist between adjoining surfaces of the base 12 and support 15, suitable flexible molding strips 22 may be secured in position to close such space and prevent insects from passing therethrough.

Each of the ribs 14 is provided with abutments which extend from its surfaces and, in the present embodiment, such abutments may be formed by pegs 23—24, which are either molded integrally with the insulator or are dielectric pegs suitably secured in apertures formed in the ribs. In any event, the series of pegs projecting from one side of the rib 14 are off-set with respect the series of pegs projecting from the opposite rib side. As seen in Figure 3, the pegs on one side are disposed intermediate of the pegs on the opposite side.

The pegs 23, 24 form anchoring points around which electrode wires are wound and which may be of small gauge formed of any suitable current conducting material, preferably corrosion resistant. The electrode wire may be wound around the pegs in various manners, two of which are illustrated in Figures 3 and 6.

Referring particularly to Figure 3, a first electrode wire 25 may lead from a source of electrical energy and may be wound around the uppermost peg 23a of the insulator member 12. The reach 25a of the wire 25 spans the space between the insulator members and is wound around the uppermost peg 23b of the insulator member 11. The succeeding reach 25b of wire spans the space between the insulator members and is then wound around the adjoining peg 23c of the insulator member 12. This winding is continued to the lowermost peg 23x of the insulator member 11 and this last mentioned peg is shown as being half round in cross-section to conserve space.

It will be noted that the pegs 23a and 23b are located on common sides of the ribs 14 of the insulator members 10—11. As shown in Figure 3, the wire 25 is connected to one terminal of the secondary of a transformer 26 which may be of any suitable commercially available type. Preferably, the transformer has a tapped secondary winding capable of providing 1,000 to 24,000 volts at a very low amperage rating. The primary of the transformer 26 has one terminal connected to a power line L1 and the other line L2 is connected to a rheostat 27 of any suitable commercially available type. The lines L1 and L2 may lead from any standard supply of current, such as 115 volts commonly used in residential wiring. A conductor 28 connects the rheostat 27 to the other terminal of the transformer 26. In accordance with the foregoing electrical connections, it will be noted that the electrode wire 25 is adapted to carry current of one potential.

A second electrode wire 29 leads from the opposite terminal of the transformer secondary and, as shown in Figure 3, is wound around the uppermost peg 24a of insulator member 11 and its reach 29a spans the space between insulator members 11—12 and is then wound around uppermost peg 24b on insulator member 12. The wire 29 returns to peg 24c of insulator member 11 and is continued around succeeding pegs 24 to lowermost peg 24x of insulator member 12.

It will be noted that the wires 25 and 29 are connected to opposite terminals of the transformer secondary and will therefore respectively carry current of opposite polarity. It will also be noted that the reaches of wire 29 (shown in dotted lines between the insulator members 11—12 for purpose of clarity) are disposed intermediate the reaches of wire 25. The spacing between adjoining reaches should be sufficient to prevent interengagement of the wires and yet should be small enough so that an insect attempting to pass therethrough will short across adjoining reaches of opposite polarity and will thereby be electrocuted. The short circuiting effected by an insect will not burn out the transformer since in most cases it is only momentary.

In Figure 3, the legs 23, 24 on the respective insulator members 11—12 are shown spread apart for the purposes of clarity, although it is preferable to have these pegs in alignment as shown in Figures 1 and 2.

Figure 6 shows another manner of winding the wires 25 and 29 around the pegs. As herein shown, the wire 25 may pass around a peg 23 and then extend downwardly around the adjoining peg on the same insulator member before it passes across to the other insulator member, and this type of winding is continued to the lowermost peg 23. The wire 29 is also wound in like fashion about the pegs 24.

It will be noted that all parts of the insulator members 11—12 adjacent to the electrode wires are open and easily accessible and available for cleaning. Thus, any foreign matter which may deposit on the insulator members may be readily removed without dismantling the apparatus. The coil springs 19, it will be appreciated, maintain the reaches of the electrode wires in taut relation, regardless of expansion caused by temperature increases.

Surface creepage of electrical current along the insulator members has heretofore been a major problem because of the close spacing required between the electrode wires 25 and 29. My invention minimizes this problem by reason of the fact that the rib 14 of the insulator member has been configured to provide maximum insulating surface between the electrodes. As best shown in Figures 1 and 2, the surface increase is preferably provided by forming a V-shaped groove 30 in the end of each rib 14.

As heretofore mentioned, the insulator members 11—12 may be used in paired relation as shown in Figures 1 and 2, or pairs of such members may be stacked as suggested in Figure 3 to produce an apparatus of any required height. Since the electrode wires 25, 29 are maintained in taut relation by the coil springs 19, the spacing between the insulator members 11—12 may be considerable so that both flexibility in height and width is therefore provided to suit given requirements.

When pairs of insulator members are stacked, the holding action provided by the bolts or screws 17 may be sufficient to maintain the plurality of members in alignment. If further alignment means is required tongue and socket means 31, 31a may be provided between adjoining end surfaces of the members.

To provide ease in electrical connection between stacked insulator members, the lower end of wire 25 (extending from peg 23x, see Figure 3) may connect to an electrical socket 32 and an electrical plug 33 connected to a corresponding electrode wire of the lower insulator member may be seated in the socket. Socket and plug connections 34, 35 may be carried by the opposite stacked insulator members 12—12 for electrical connection purposes. In some cases the electrical plug and socket connections will be sufficient to align the stacked insulator members and the plug and sockets 31, 31a may be omitted.

It is desired to operate my improved apparatus at highest maximum efficiency consistent with weather conditions and since the reaches of the electrode wires 25, 29 are closely spaced and the impressed voltage is high, care must be taken to prevent arcing of current from one reach to an adjoining reach as may be caused by variations of humidity conditions.

In this connection, I provide a humidistat 36 of any suitable commercially available type and establish a drive connection 37 between the rheostat 27 and the humidistat 36. The humidistat may include a member (not shown) which rotates in accordance with variations in humidity conditions and such member is connected to a rotatable part (not shown) of rheostat 27 by drive connection 37, to rotate such part and thereby change the resistance of the rheostat in accordance with changes in humidity.

Figure 4 shows an enclosure which may be formed through use of my invention. Such enclosure may provide a pen for animals, or an insect and vermin proof storage for materials, or a patio or play area enclosure, or any other suitable housing.

Certain, or all of the walls of the enclosure may be formed by use of my invention and in the form shown in Figure 4, the side, end and top walls are defined by reaches of wire to keep out insects and vermin and to provide for ventilation.

The enclosure shown in Figure 4 may be formed in any suitable manner. For example, upright members 38 may provide the supports 15 for the spaced insulator members defining each side and end wall and horizontal members 39, connected to the members 38 may provide the supports 15 for the spaced insulator members defining the top wall of the enclosure. The additional top and bottom horizontal members shown in Figure 4 may be used to complete the enclosure.

It will therefore be seen that my invention provides a safe screen against insects and vermin and that protective screens of any size or configuration may be easily constructed for various uses.

In view of the foregoing it will be apparent to those skilled in the art that I have accomplished at least the principal object of my invention and it will also be apparent to those skilled in the art that the embodiment herein disclosed may be variously changed and modified, without departing from the spirit of the invention, and that the invention is capable of uses and has adavntages not herein specifically described, hence it will be appreciated that the herein disclosed embodiment is illustrative only, and that my invention is not limited thereto.

I claim:

1. An electric destroyer assembly for insects and the like, comprising a pair of insulator members of predetermined length, each having a longitudinal rib, said members being held spaced with said ribs aligned and in facing relation, abutments spaced longitudinally along opposite sides of each rib, a first electrode wire for carrying current of one polarity serially wound around and between abutments extending from one set of common sides of said ribs, a second electrode wire for carrying current of the opposite polarity serially wound around and between abutments extending from the opposite set of common sides of said ribs, said abutments being closely spaced to dispose the reaches of said wires in close proximity whereby an insect attempting to pass through said reaches shorts therebetween, and an end of each of said insulator members having a socket adapted for receiving a projection on the respective ends of similar insulator members of another assembly to mechanically connect said assemblies.

2. The construction according to claim 1 wherein said projection and socket connections respectively electrically connect the electrode wires of said assemblies.

3. An electrical destroyer of insects and the like, comprising spaced insulator members having facing longitudinally extending portions, abutments extending from opposite sides of each of said portions, a first electrode wire adapted to carry current of one polarity and serially wound around and between abutments on one side of each of said portions, a second electrode wire adapted to carry current of the opposite polarity and serially wound around and between abutments on the other side of each of said portions, the reaches of said first and second electrode wires being disposed in proximity whereby an insect and the like attempting to pass through said reaches shorts therebetween and is electrocuted, means for connecting said first and second electrode wires to opposite poles of a source of high voltage, regulator means interposed in said connecting means for regulating the voltage impressed upon said first and second electrode wires, and a humidistat for operating said regulator means in response to changes in atmospheric humidity conditions.

4. An electric destroyer of insects and the like, comprising a pair of insulating members, each of T-shaped cross-section, the bases of the T-shaped sections being adapted for securement to spaced supports whereby the ribs of said sections are in spaced facing relation, a series of abutments extending from opposite sides of each of said ribs, a first electrode wire adapted to carry current of one polarity and serially wound around and between abutments on one side of each of said ribs, and a second electrode wire adapted to carry current of the opposite polarity and serially wound around and between abutments on the other side of each of said ribs, the reaches of said electrode wires being spaced apart a slight amount to prevent interengagement and yet interengage with an insect seeking to pass through said reaches to electrocute such insect, a transformer electrically connected to said first and second electrode wires for supplying high-voltage low-amperage current to the same, a rheostat for varying said voltage, and a humidistat for automatically operating said rheostat in accordance with changes in atmospheric humidity conditions.

5. An electrical destroyer of insects and the like, comprising a pair of insulator members each including a rib, a series of spaced pegs extending transversely from and disposed in a line along opposite sides of each rib, the pegs on one side of a rib being staggered with respect to the pegs on the opposite side of such rib, spaced support members, mounting means engaging said insulator members for securing the latter to said support members in spaced relation and with said ribs facing each other and aligned and the pegs on opposite sides of one rib in corresponding alignment with the pegs on opposite sides of the other rib, a first electrode wire adapted to carry current of one polarity and starting from an end peg of one of the series of pegs on one side of one rib and extending across and secured to the corresponding end peg of the series of pegs on the corresponding side of the spaced rib and from the latter rib again across the space back to the said one rib and serially continuing back and forth in reaches and anchored to successive pegs, and a second electrode wire similarly connected to the pegs on the corresponding opposite sides of the spaced ribs, the reaches of respective electrode wires being disposed in slightly spaced parallel planes and the staggering of said pegs placing the reaches of one wire intermediate adjoining reaches of the other wire.

6. An electrical destroyer of insects and the like, comprising a pair of insulator members each T-shaped in cross-section to provide a base and a rib extending laterally from said base, a series of spaced pegs extending transversely from and disposed in a line along opposite sides of each rib, the pegs on one side of a rib being staggered with respect to the pegs on the opposite side of such rib, spaced support members, mounting means engaging the bases of said insulator members for securing the latter to said support members in spaced relation and with said rib facing each other and aligned and the pegs on opposite sides of one rib in corresponding alignment with the pegs on opposite sides of the other rib, a first electrode wire adapted to carry current of one polarity and starting from an end peg of one of the series of pegs on one side of one rib and extending across and secured to the corresponding end peg of the series of pegs on the corresponding side of the spaced rib and from the latter rib again across the space back to the said one rib and serially continuing back and forth in reaches and anchored to successive pegs, and a second electrode wire similarly connected to the pegs on the corresponding opposite sides of the spaced ribs, the reaches of respective electrode wires being disposed in slightly spaced parallel planes and the staggering of said pegs placing the reaches of one wire intermediate adjoining reaches of the other wire.

7. The construction according to claim 5 wherein the reaches of the electrode wires adjoining respective ribs closely lie along the respective side surfaces of such ribs and facing end surfaces of the ribs are each formed with a V-shaped groove to provide an increased rib surface between wires of opposite polarity and thereby decrease tendency for current creepage along rib surfaces and between such wires.

8. The construction according to claim 6 and further including resilient means urging said insulator member apart to maintain tension on the wire reaches.

References Cited in the file of this patent

UNITED STATES PATENTS

| | | |
|---|---|---|
| 974,785 | Frost | Nov. 8, 1910 |
| 1,879,495 | Renwick | Sept. 27, 1932 |
| 1,882,550 | Frost | Oct. 11, 1932 |
| 1,910,623 | McWilliams et al. | May 23, 1933 |
| 2,244,191 | Evans | June 3, 1941 |
| 2,512,740 | Evans | June 27, 1950 |

FOREIGN PATENTS

| | | |
|---|---|---|
| 676,241 | France | Nov. 28, 1929 |